Aug. 10, 1943.    P. S. BALDWIN    2,326,116
HYDRAULIC PRESSURE TRANSMISSION SYSTEMS
Filed May 11, 1940    2 Sheets-Sheet 1
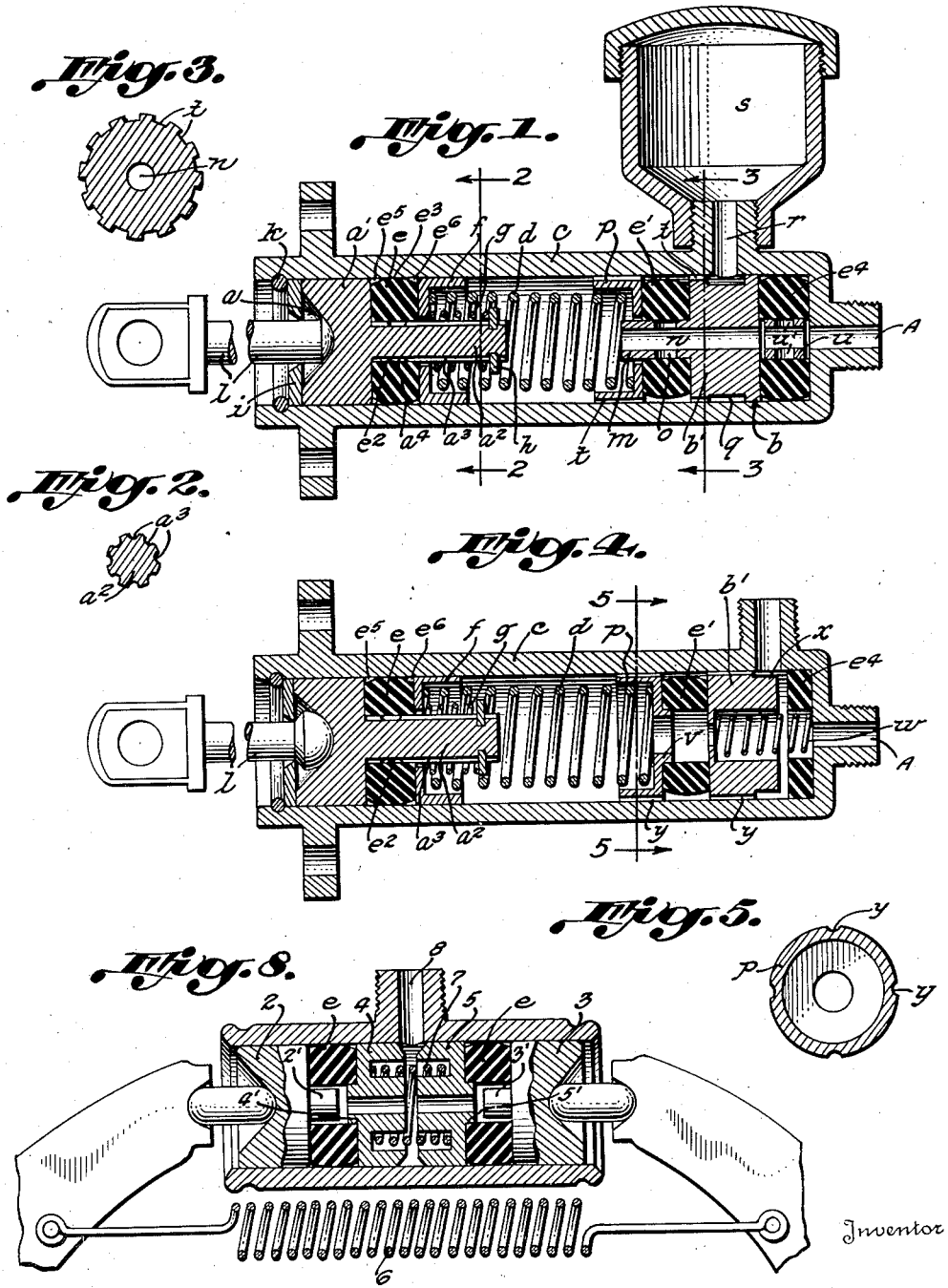
Inventor
PHILIP S. BALDWIN
By Max Wall
Attorney Aug. 10, 1943.   P. S. BALDWIN   2,326,116
HYDRAULIC PRESSURE TRANSMISSION SYSTEMS
Filed May 11, 1940    2 Sheets-Sheet 2
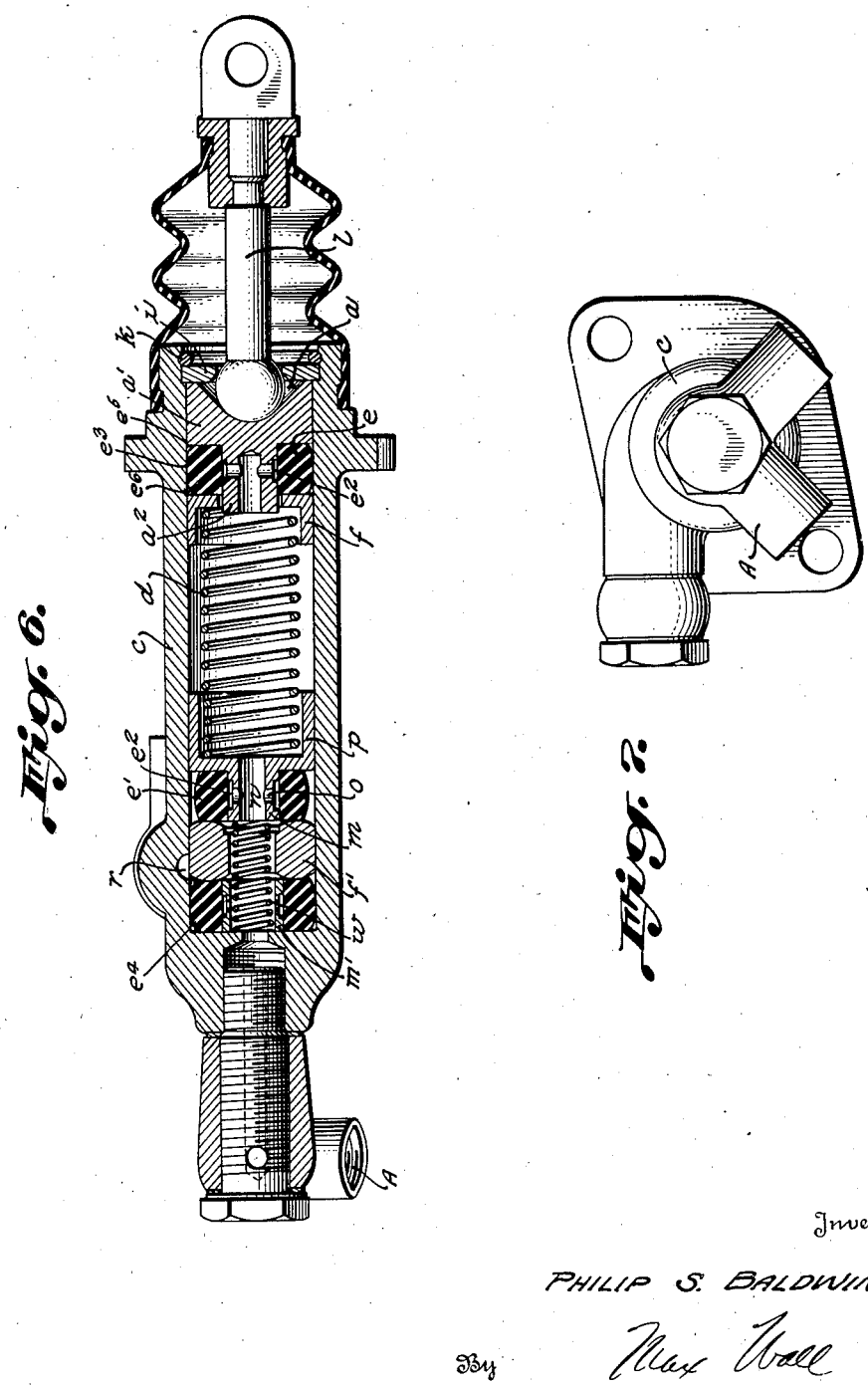
Inventor
PHILIP S. BALDWIN
By
Attorney Patented Aug. 10, 1943

2,326,116

UNITED STATES PATENT OFFICE 2,326,116

HYDRAULIC PRESSURE TRANSMISSION SYSTEM

Philip Sidney Baldwin, Florence, Italy; vested in the Alien Property Custodian

Application May 11, 1940, Serial No. 334,661

19 Claims. (Cl. 60—54.6)

This application is a continuation in part of my prior application Serial No. 143,805, filed May 20, 1937, Patent No. 2,276,009.

This invention relates to improvements in hydraulic pressure transmission systems and more particularly to the arrangement of expansible resilient or elastic piston packings of the type disclosed in my prior application referred to above, and has as its object the mounting of such pistons in pairs in a cylinder where they are held in opposed spaced relation to each other under spring tension, and wherein they work together to open and close the hydraulic circuit and allow transmission of hydraulic pressure with low frictional resistance and elimination of air from the system.

Another object of this invention is to provide, in a device of this nature, a master cylinder utilizing resilient packings which expand and contract in their reciprocal movements in the cylinder, this furnishing a piston of low frictional resistance which is self lubricating in the cylinder, and which at the same time, may provide a positive seal against the influx of air and loss of liquid from the system. A further object is to provide a novel valve for controlling the liquid circuit in a system of this kind, the valve working on the same principle as the prime mover piston, and in response to the movements thereof.

These improvements may be put into practice in various ways, and in the accompanying drawings are illustrated by way of example several forms of practical application of the invention to a hydraulic brake master cylinder, and to a wheel motor cylinder, respectively.

In all the various figures, like reference characters designate like parts.

Figure 1 is a longitudinal sectional view of a master cylinder with two opposed pistons, constructed according to the present invention.

Figure 2 is a transverse sectional view of a detail of Figure 1.

Figure 3 is a transverse sectional view of another detail of Figure 1.

Figure 4 is a longitudinal sectional view showing a modified form of master cylinder constructed according to the present invention.

Figure 5 is a transverse sectional view of a detail of Figure 4.

Figure 6 is a longitudinal sectional view of a further modified form of master cylinder constructed according to the concept of the present invention.

Figure 7 is an end view of the device shown in Figure 6.

Figure 8 is a longitudinal sectional view of a wheel cylinder with opposed pistons constructed according to the present invention.

As illustrated in Figure 1, two piston units, $a$, $b$, are mounted in a master cylinder $c$ and are held in spaced relation to each other under compression of the spiral spring $d$.

The piston $a$, at the rearward end of the cylinder, includes a metal head $a^1$ having a diameter substantially equal to that of the cylinder bore, and a reduced stem $a^2$ on which is seated a resilient, expansible packing element $e$ made of rubber or a rubber substitute. This packing element $e$ may normally have a maximum diameter which is slightly less than that of the bore of the cylinder $c$. The element $e$ has a central bore $e^2$ and has an outer periphery which is arcuate in cross section, having a high point or apex $e^3$.

The stem $a^2$ of the head $a^1$ is provided with a series of longitudinal channels $a^3$ along its entire length, as shown in Figure 2, with an annular channel $a^4$, corresponding to and in alignment with the longitudinal center of the element $e$ to permit free passage of the hydraulic liquid in the cylinder to the bore of the element $e$; the bore extending completely through the element.

On stem $a^2$ a metal cup $f$ is fitted, which is slidable on the stem, and which the spring $d$ abuts. A stop lug or washer $h$ is fitted to the stem $a^2$ which is slotted peripherally near its end to receive the washer $h$, the washer being spaced from the cup $f$. The spring $g$, mounted on the stem $a^2$, is kept under constant compression between the said cup and the stop washer $h$, and serves to initially compress axially the element $e$ and expand it radially into permanent contact with the cylinder wall at the apex of its periphery. A metal plate $i$ and a lock ring $k$ prevent the piston $a$ and its thrust rod $l$ from leaving the cylinder rearwardly. The said rod $l$ is connected with the operating mechanism, for example, of an automobile brake pedal (not shown).

The opposed valve piston $b$, including its component parts, is situated at the forward end of the cylinder and is normally held in substantially stationary position therein under compression of the spring $d$. The said piston comprises a metal head $b^1$ having a maximum diameter substantially equal to the internal diameter of the cylinder $c$, and a reduced stem $m$, projecting into the cylinder therefrom, the expansible resilient packing $e^1$, which may be identical with the packing element of the piston $a$, being seated on said stem $m$. The stem $m$ and the head $b$ are bored throughout their length to provide a bore or passage $n$ through which communication is established between the cylinder and the external hydraulic circuit. The transverse vents $o$ are provided in the stem, in alignment with the longitudinal center of the packing element $e^1$, to provide a passage for the liquid from the cylinder to the bore of said packing element. This element $e^1$ is normally and initially completely spaced from contact with the cylinder wall, the spacing being exaggerated in the drawings for the purpose of illustration.

The reduced stem $m$ is fitted with the metal cup $p$ which is slidable thereon and which is held in position against the packing $e$ by spring $d$. The cup is provided on its peripheral surface with longitudinally extending channels $t$ to permit free passage of hydraulic liquid or air to the reserve tank as will hereinafter be described.

The piston head $b^1$ is provided with an annular peripheral groove $q$ which registers with the port $r$ of the cylinder to establish communication between the cylinder and the reserve tank $s$ located over the cylinder, through a series of longitudinal channels $t$ cut in the periphery of the piston head $b^1$ adjacent the element $e^1$, the channels being shown in Figure 3. The packing element $e^1$ is normally completely spaced from the cylinder wall along its entire periphery, so that there is a free passage for the liquid in the system between the interior of the cylinder and the reserve tank, around the peripheries of the cup $p$, the packing element $e^1$, and the head $b^1$. An elastic packing $e^4$, which may be identical with element $e$ is placed between the piston head $b^1$ and the end or base of the cylinder, and is expanded radially into permanent contact with the cylinder wall by means of an expander tube $u$ having centrally disposed ports $u^1$, which is inserted in the packing bore, this packing serving to seal the base of the cylinder.

At the start of the protractile stroke, when the cylinder is empty, the packing element $e$ of piston $a$, which is under initial axial compression of spring $g$, is further compressed axially by spring $d$, the compression of which increases with the forward stroke and complements the mechanical pressure exerted by the spring $g$ to further expand the element $e$ radially, while element $e^1$ of the valve piston $b$ is also compressed axially and expanded radially with progressively increasing compression by the spring $d$ and whatever air is in the cylinder is expelled into the reserve tank $s$ from around the peripheries of the cup $p$, packing $e'$ and piston head $b$, until the packing $e^1$ contacts the cylinder wall at the apex $e^3$ of the elastic periphery at the end of the stroke of piston $a$. Since the packing $e'$ is initially completely spaced from the cylinder wall there is a time lag before it closes after the forward movement of the piston $a$ begins. This time lag in the closing of the valve is designed to allow the piston unit $a$ to force out, around the periphery of the valve packing $e'$, any air which may have been trapped in the cylinder. With the return of piston $a$ and the release of the mechanical pressure of spring $d$, element $e^1$ of the valve piston contracts radially away from the cylinder wall and reestablishes communication between the cylinder and the reserve tank, and liquid is drawn into the cylinder from the reserve tank by suction until the cylinder is completely filled. If piston $a$, with its component parts, is now advanced in the cylinder, there is a certain resistance to the passage of liquid around the periphery of the valve and hydraulic pressure is thus built up axial on the two packing element $e$ and $e^1$ and radially through the bores thereof on the inner walls of the same. This hydraulic pressure complements the mechanical axial pressure of spring $d$ to ensure the radial expansion of packing element $e^1$ of the piston $b$ into sealing contact with the cylinder wall, as the compression stroke begins to close to shut off the circuit with the reserve tank. The pump is now operative to transmit hydraulic pressure to the brake system through outlet A. When pressure is released, piston $a$ is returned in the cylinder by spring $d$, the elements $e$ and $e^1$ contract radially, and communication with the reserve tank is reestablished around the periphery of the piston $b$ and its component parts, the head $b^1$, packing $e^1$, and cup $p$.

In the modified form of Figure 4, there is a variation in the arrangement of the valve piston $b$ and its component parts which, instead of remaining substantially stationary in the cylinder, is slidable therein in response to the movements of the prime mover piston $a$, and communication with the reserve tank is accomplished through the bore of the piston instead of around its periphery when the prime mover is in retracted position. Inasmuch as the function of piston $a$ in the two forms of application is the same, only the operation of the modified valve piston will now be described.

The elastic packing element $e^1$ is seated on an annular, forwardly projecting collar $v$, provided on the metal cup $p$, and is held between said cup and the piston valve head $b$ under the counteracting compression of the spring $d$ and the release spring $w$. The metal valve piston head $b^1$ has an annular reduced portion $x$ at its leading end registering with the port $r$ communicating with the reserve tank, and is yieldably supported in slight spaced relation to the cylinder base sealing packing $e^4$ by means of the compression of spring $w$ which rests against the base of the cylinder at one end and against the base of the socket in the metal piston valve head $b^1$ at the other end. The piston head $b^1$ serves as a spacer member to keep the packing $e^1$ from covering the reserve tank port 5. The parts $p$, $e^1$, $b^1$, $e^4$, are all provided with a longitudinal, substantially aligned bore throughout their respective lengths to permit free passage of liquid from the cylinder to the brake system, and to provide a means of communication between the cylinder and reserve tank when the prime mover is in retracted position. The parts $p$, $b^1$, may be provided with only four minute longitudinal channels $y$ on their peripheries (see Figure 5) to facilitate the expulsion of air from the interior of the cylinder to the reserve tank around said parts and around the periphery of the packing element $e^1$ which is normally and initially completely spaced from the cylinder wall, as indicated in the drawings. It will be noted that the cup $p$ in Figure 4, by reason of the restricted number of channels, will offer greater resistance to the passage of liquid, but will pass air freely.

At the start of the protractile stroke of piston $a$ and its component parts, when the cylinder is empty, the piston $b$ including $p$, $e^1$, $b^1$ is moved forward under the action of the spring $d$ which immediately overcomes the resistance of spring $w$, and the face $b^2$ of the valve piston head $b^1$ is brought into abutting contact with the elastic packing $e^4$ at the base of the cylinder. When air is present in the cylinder it is expelled into the reserve tank around the periphery of the valve piston through channels $y$, as described, during the whole compression stroke of piston $a$ with its component parts because the compression of spring $d$ is not of itself sufficient to expand radially the packing element $e^1$ of the valve piston $b$ into sealing contact with the cylinder.

Upon release of pressure, piston $a$ is returned in the cylinder by spring $d$, and the valve piston $b$ is retracted away from the cylinder base sealing element $e^4$, and liquid is drawn into the cylinder from the reserve tank by suction. When all air has been eliminated from the cylinder, on the next forward movement of the piston $a$, the liquid flows along the passages $a^3$ of the stem $a^2$ to the bore of packing $e$ and cooperates with the mechanical pressure of spring $d$ to expand element $e$ radially into sealing contact with the cylinder at the start of the compression stroke, as already described. In view of the fact that in this form of application, the supply of liquid to the cylinder is secured through the bore of valve piston $b$ and its component parts by retraction of the valve piston instead of around the periphery of same as in the other form described, the axial mechanical compression of spring $d$ contributes to the radial expansion of the packing $e^1$ to a lesser extent because there is considerably less free space around the peripheries of the metal parts $p$ and $b^1$, and there is therefore more resistance to the passage of liquid which thus cooperates to a greater extent in the radial expansion of the element $e^1$. This permits of the use of a lighter return spring $d$ than in the other form of application described.

Upon release of pressure, the valve piston element $e^1$ will contract radially away from the cylinder wall and will leave the piston completely free to retract away from the base sealing element $e^4$ under the influence of the spring $w$. Without this radial contraction of packing element $e^1$, the valve piston would not be released for its retractile movement, and the circuit with the reserve tank would remain closed, especially when an excessive amount of liquid is drawn into the cylinder through frequent manipulation of the pump, or brake pedal.

In the modification shown in Figure 6, the packing $e$ of the prime mover piston $a^1$ is stretched over the stem $a^2$ so that it is initially expanded radially into static contact with the cylinder wall at the apex of its periphery, the diameter of the stem $a^2$ being greater than that of the bore of the packing $e$. This ensures an initial plug seal in the cylinder, the peripheral portions adjacent the end walls of the packing remaining spaced from the cylinder wall, as at $e^5$ and $e^6$.

In the valve piston at the opposite end of the cylinder, the packing $e^1$ is normally completely spaced from the cylinder wall along its entire periphery. The packing $e^4$ at the base of the cylinder is expanded radially into static contact with the cylinder wall by inserting an expander tube $m^1$ in the bore of the element and this is held stationary in the cylinder to ensure an end seal therefor.

The metal parts $a^1$, $f$, $p$, and $f^1$ have a loose fit in the cylinder to allow passage of liquid and air. Spring $w$, which abuts against the end of stem $m$ of cup $p$ at one end, and against the base of the cylinder at the other end, is held under axial compression by spring $d$. The compression of the two springs in the released or retracted position of the prime mover piston is equal and therefore neutralizes each other, and the initial mechanical pressure on valve element $e^1$ by spring $d$ is therefore counteracted by spring $w$. This relieves the elastic valve element of all initial axial mechanical compression.

In operation, when the prime mover piston is advanced, any air which is present in the system, air being highly compressible, is freely expelled from the cylinder around the periphery of the valve piston into the reserve tank, for the whole length of the stroke because the maximum mechanical pressure supplied by the spring $d$ is not, of itself, sufficient to expand the valve packing $e^1$ radially into contact with the cylinder wall. Liquid is drawn into the cylinder by suction on the return stroke of piston $a$.

When all air has been expelled from the system and the prime mover piston is again advanced, there is resistance to the passage of liquid around the periphery of the metal cup member $p$, and hydraulic pressure is built up on the end face of element $e'$ and radially on the inner face of the bore thereof. This pressure is complemented by the progressively increasing axial mechanical pressure of spring $d$ and the elastic element is expanded radially into sealing contact with the cylinder wall to close the circuit with the reserve tank. Upon release of pressure, the elastic element contracts away from the cylinder wall and communication between the reserve tank and the cylinder is reestablished around the periphery of the valve piston, thus permitting escape of any excess liquid drawn into the system and compensating for any differential in the volume of the liquid due to variations in temperature.

In the several master cylinder forms of the invention, upon advance of the prime mover piston, when the circuit with the reserve tank is closed, hydraulic and mechanical pressure is built up axially on the leading face of the elastic element and hydraulic pressure is exerted radially on the inner face of same. These combined pressures expand the spaced trailing end $e^5$ of the elastic element into contact with the cylinder, the leading end $e^6$ of the packing, which is surrounded by liquid, remaining spaced from the cylinder during the whole compression stroke. Upon release of pressure, the trailing end $e^5$ of the packing contracts away from the cylinder wall and fluid is discharged from the element. The contact area of the elastic element with the cylinder is thus reduced to a minimum and adequate lubrication of the piston is ensured with resultant rapid recovery of the piston in the cylinder. Were the whole periphery of the elastic element kept in static contact with the cylinder wall, the latter would be wiped dry during the reciprocal movements of the piston, and high frictional resistance and wear would result.

The counteracting axial and radial hydraulic pressures tend to preserve the elastic element from permanent deformation and from taking a permanent set after being subjected to high pressures for a considerable period. When elastic material, such as rubber, is subjected to high pressure in one plane (axially, for example), a certain amount of flow takes place in the elastic mass which will tend to permanently fill any empty space between that mass and the cylinder wall. It is the counteracting pressures, supplied in this type of construction, which permit the elastic packing element to be used as a valve member with its periphery completely spaced from the cylinder. Were the element in this particular construction subjected only to axially applied hydraulic pressure taking effect radially on the inner face or bore, the element would gradually spread radially through flow of the elastic mass until the periphery would come into permanent contact with the cylinder wall and close the circuit with the reserve tank.

It will be observed that in the several forms illustrated and described, the packing of the prime mover piston is at least in partial contact with the cylinder wall, whereas the packing of the valve piston is completely spaced from the cylinder wall.

In the form of application illustrated in Figure 8, two expansible elastic elements e are mounted opposite each other in a brake wheel motor cylinder as ordinarily mounted on the wheels of an automobile. The said elements e are held between the metal piston members 2, 3 and the metal cups 4, 5, respectively, under tension of the return spring 6 and the central compensator spring 7, which holds them in spaced relation to each other. The return stroke of the opposed pistons towards the center of the cylinder is limited by a stop (not shown) which may be the cam registering device normally mounted against the inner rim of the brake shoes. The spring 7 is located in suitable annular sockets formed in the cups 4, 5. The said cups are normally held slightly spaced from each other at the center of the cylinder. The round extensions $2^1$, $3^1$, of the piston heads 2, 3, freely penetrate into the bores of packing elements 4 and serve to limit the empty space therein.

The elements e, which normally may have a maximum diameter which is slightly less than that of the cylinder bore, are seated on the annular collars $4^1$, $5^1$ of the base parts 4, 5. The counteracting force of the springs 6, 7, compress the said elements axially and expand them radially into permanent contact with the cylinder wall at the apex of their peripheries, thus ensuring an initial hydraulic seal and preventing influx of air into the cylinder. When hydraulic pressure is applied through the cylinder inlet ports 8 by means of the master pump, the opposed pistons 2, 3, move outwards to accomplish the braking stroke, against the mechanical tension of spring 6, and the elements e are further expanded radially under hydraulic pressure to ensure a compression seal.

The counteracting mechanical pressure of the springs is sufficient to expand the packing elements radially into permanent partial contact with the cylinder wall at the apex of the elastic peripheries to ensure an initial hydraulic seal, regardless of the thermal deformation. In fact, under the action of braking heat, which may reach a temperature of 150° centigrade, or more, the rubber mass expands to a considerable extent and when elements are used which have a maximum normal diameter equal to that of the cylinder bore, the radial thermal expansion will be rigidly resisted by the cylinder wall and an axial flow of the rubber will result. This axial flow produces a permanent deformation of the element which, after cooling, will assume a diameter at the apex of the periphery which is normally less than the diameter of the cylinder bore with a corresponding increase in the length. After this initial thermal deformation has taken place, the shape of the packings remains unchanged in subsequent heatings of like temperatures and the contrasting radial and axial hydraulic pressure tends to keep them so, as heretofore described.

As already indicated, the counteracting force of compensator spring 7 and the brake shoe return spring 6 tend to keep the elastic elements in permanent contact with the cylinder under all circumstances, thus providing a positive seal against escape of fluid and influx of air. Any axial thermal expansion of the elements is automatically taken up by spring 7 which holds them in opposed spaced relation to each other at the center of the cylinder between their metal end parts and permits of free return of the pistons in the cylinder upon release of pressure under action of the return spring.

By keeping the mean free circumference of the elements well under that of the cylinder bore, a piston with very low frictional resistance is secured even when subjected to heat.

Because of the structure of the elements, which must have sufficient body to support, of themselves, the axial mechanical compression without buckling or twisting in the cylinder, rigid supports within the elastic bodies may be dispensed with and they may be freely mounted between the rigid adjacent parts instead of seated on stems, as illustrated. Such free mounting would add to the resilience of the packings in adapting themselves to the thermal expansion and contraction phenomena described above.

When the pressure in the wheel cylinder is released, the elastic elements contract radially and expel their liquid content, and pistons 2, 3, are returned in the cylinder by spring 7 which has a greater tension than spring 6. The frictional resistance to the return of the pistons is thus reduced to a minimum. The axial mechanical compression under which the elements e are constantly kept is sufficient to ensure their contact with the cylinder wall under all circumstances and thus compensates for any eventual thermic deformation in the elastic mass through braking heat.

As used in the specification, the term "piston" or "prime mover piston" includes the packing element e and the moving parts immediately in contact therewith, such as $a^1$ and $f$. The term "valve piston" includes the packing element $e^1$ and its immediately associated moving parts, as $b^1$ and $p$. These definitions include the corresponding parts of the several figures of the drawings.

It is to be understood that the various constructions and arrangements of the parts as illustrated and described are submitted as practical embodiments of the working principles involved, and may be modified as to details without departing from the spirit of the invention.

Having thus described my invention, I claim:

1. A hydraulic pressure transmission system comprising a master cylinder, a reserve tank in communication therewith, opposed pistons mounted in the cylinder and yieldably held in spaced relation to each other; resilient, expansible packings for the pistons, one of the pistons functioning as a prime mover and the other piston as a valve member to control communication with the reserve tank, the packing of the prime mover piston being expanded radially by mechanical means into permanent partial contact with the cylinder wall, the packing of the valve piston being initially completely spaced from the cylinder, the said packings being further expanded radially by mechanical and hydraulic pressure into sealing contact with the cylinder wall, the said pressure increasing progressively with the compression stroke of the prime mover piston.

2. A hydraulic pressure transmission system comprising a master cylinder, a reserve tank in communication therewith, opposed pistons mounted in the cylinder and yieldably held in spaced relation to each other; resilient, expansible packings for said pistons, one of the pistons functioning as the prime mover and the other piston as a valve member, the packing periphery of the prime mover piston being initially at least in partial contact with the cylinder wall, the packing of the other piston being normally and initially completely spaced from the cylinder wall to establish communication between the cylinder and the reserve tank around the periphery of the valve piston, said communication being closed through radial expansion of the valve packing into sealing contact with the cylinder wall during the protractile stroke of the prime mover piston, and reestablished through radial contraction of said valve packing during the retractile stroke of the prime mover piston.

3. A hydraulic pressure transmission system comprising a master cylinder, a reserve tank in communication therewith, opposed pistons mounted in the cylinder and yieldably held in spaced relation to each other; resilient, expansible packings for the pistons, one of the pistons functioning as the prime mover and the other piston as a valve member, the packing of the valve member being normally and initially completely spaced from the cylinder wall, communication between the cylinder and the reserve tank being established exclusively around the periphery of said valve piston, the said communication being closed through radial expansion of said packing into sealing contact with the cylinder wall during the protractile stroke of the prime mover piston and reestablished through radial contraction of the packing during the retractile stroke of the prime mover piston, the valve member piston being yieldably held substantially stationary in the cylinder.

4. A hydraulic pressure transmission system comprising a master cylinder, a reserve tank in communication therewith and an external hydraulic circuit, opposed pistons mounted in the cylinder and yieldably held in spaced relation to each other, one of the pistons functioning as a prime mover, the other piston as a valve member to control communication with the reserve tank; resilient, expansible packings for said pistons, the packing of the prime mover piston being initially mechanically compressed axially and expanded radially into partial contact with the cylinder wall, the packing of the valve piston being initially completely spaced from the cylinder wall, both packings being further compressed axially and expanded radially by progressively increasing mechanical and hydraulic pressure during the compression stroke of the prime mover piston, the valve piston having a bore throughout its length to establish communication between the interior of the cylinder and the external hydraulic circuit, communication with the reserve tank being established around the periphery of the valve piston when the prime mover piston is in its fully retracted position, said communication between cylinder and reserve tank being closed through radial expansion of the packing against the cylinder wall during the compression stroke of the prime mover piston.

5. A hydraulic pressure transmission system comprising a master cylinder, a reserve tank in communication therewith, opposed pistons mounted in the cylinder and yieldably held in spaced relation to each other; resilient, expansible packings for the pistons, one of the pistons functioning as the prime mover, the other piston as a valve member to control communication with the reserve tank, the valve piston having a bore throughout its length, the said communication being established both around the periphery of the valve member piston and through its bore during its reciprocal movements in the cylinder, in response to the movements of the prime mover piston, the communication around the valve piston periphery being open when the prime mover piston is in its fully retracted position.

6. A hydraulic pressure transmission system, comprising a master cylinder, a reserve tank in communication therewith, opposed pistons mounted in the cylinder and yieldably held in spaced relation to each other; resilient, expansible packings for the piston; one of the pistons functioning as the prime mover, the other piston as a valve member to control communication with the reserve tank, the valve piston being so constructed and arranged that air trapped in the cylinder may be expelled into the reserve tank around its periphery during the protractile stroke of the prime mover piston.

7. A hydraulic pressure transmission system comprising a master cylinder, a reserve tank in communication therewith, a port connecting said reservoir and cylinder, a piston and a valve in said cylinder, said valve comprising a resilient expansible packing which is disposed between said port and said piston and which is normally spaced from the cylinder wall, said packing being expanded and contracted, respectively, into and out of contact with the cylinder wall in response to the reciprocal movements of the piston in the cylinder.

8. A hydraulic pressure transmission system comprising a master cylinder, a reserve tank, a port in the cylinder connecting the two, a prime mover piston and a valve piston in said cylinder, the valve piston lying between said port and prime mover piston, communication between said reservoir and cylinder being maintained around the periphery of said valve piston, an expansible packing for each piston, the packing of the prime mover piston being partially in contact with the cylinder wall, and the packing for the valve piston being spaced from the cylinder wall, both packings being so constructed and arranged as to be expanded radially upon the forward movement of the prime mover piston, the packing of the prime mover piston being pressed against the cylinder wall for the compression stroke to form a compression seal, and the packing for the valve piston being expanded against the cylinder wall to shut off communication with the reserve tank during the compression stroke.

9. A hydraulic master cylinder having a prime mover piston and a valve piston disposed at opposite ends of the cylinder and means for yieldably spacing said pistons, a port in said cylinder leading to a source of liquid supply, said valve piston being disposed between said prime mover piston and port, each of said pistons having an enlarged head slidable in the cylinder and a reduced stem on each head, an expansible packing seat on each stem and means for conducting fluid under pressure to each packing to expand the same radially, the packing of the prime mover piston being partially in contact with the cylinder wall and expanded into more substantial contact therewith on the compression stroke, the packing of the valve piston being normally initially spaced from the cylinder wall and expanded into contact therewith on said compression stroke of the prime mover.

10. A hydraulic pressure transmission system comprising a cylinder, a reserve tank in communicaion therewith, a prime mover piston and a valve piston in said cylinder yieldably supported in spaced relation to each other, said pistons having resilient, expansible packings which expand and contract with respect to the cylinder wall in response to the reciprocal movements of the prime mover piston, said valve piston lying between the prime mover and the reserve tank, being yieldably supported in spaced relation from each end of the cylinder and being slidable in the cylinder on the compression stroke to close communication with the reserve tank, and returning to its original position to reestablish such communication on the return stroke.

11. A hydraulic pressure transmission system comprising a master cylinder, a reserve tank in communication therewith, opposed pistons mounted in the cylinder and yieldably held in spaced relation to each other; expansible packings for said pistons, one of the pistons functioning as a prime mover, and the other as a valve member, the valve member including rigid portions and an expansible portion, each having a longitudinal bore throughout its length, and being slidable in the cylinder, the packing of the valve member being initially completely spaced from the cylinder wall, the rigid portions of the valve piston being provided with longitudinal passages along their peripheries to allow escape of air during a portion of the compression stroke of the prime mover, said passage being closed by radial expansion of the valve packing as the compression stroke develops, the valve piston being yieldably supported between the prime mover and the base of the cylinder and moving to shut off communication between the cylinder and reserve tank during said compression stroke, and permitting rapid replenishment of the fluid supply in the cylinder through said bore on the retractile stroke of the prime mover.

12. A hydraulic pressure transmission system comprising a master cylinder and a reserve tank in communication therewith, a prime mover piston and a valve in said cylinder, said valve controlling the flow of fluid from the reserve tank to the cylinder in response to the movements of the prime mover piston, said latter piston comprising a rigid head and a reduced extension, a thrust plate slidable on said extension, an annular expansible packing mounted on said extension between said head and said thrust plate, and yieldable means supported on said steam for initially expanding said packing into partial contact with the cylinder wall, said packing being further expanded to form a compression seal on the compression stroke of the prime mover piston under axial and radial hydraulic pressure.

13. A hydraulic pressure transmission system comprising a cylinder, a reserve tank in communication therewith, a prime mover piston and a valve piston in the cylinder yieldably supported in spaced relation to each other, said valve piston having a resilient, expansible packing which is initially spaced from the cylinder wall and expands and contracts with respect thereto in response to the reciprocal movements of the prime mover piston; said valve piston having a bore throughout its length and lying between the prime mover piston and the reserve tank, and being slidable in the cylinder in response to the reciprocal movements of the prime mover to close and open the circuit between the cylinder and the reserve tank through said bore, the valve packing being yieldably supported between two rigid members coaxial with the packing and slidable with it, one of said members being designed to limit the passage of fluid from the cylinder to the reserve tank around the valve piston periphery.

14. A hydraulic pressure transmission system comprising a master cylinder, a reserve tank in communication therewith, opposed pistons mounted in the cylinder and yieldably held in spaced relation to each other, resilient, expansible packings for said pistons, one of the pistons functioning as the prime mover and the other piston as a valve member to control communication with the reserve tank, the packing of the valve piston consisting of an elastic ring the periphery of which is normally and initially spaced from the cylinder wall, the said ring being yieldably supported between two rigid members under contrasting axial mechanical pressure, both members being bored longitudinally throughout, being coaxial with the packing and slidable with it, one of said members serving to space the packing from the reserve tank communicating means, the other member serving to control the volume of fluid flowing from the cylinder to the packing periphery.

15. A hydraulic pressure transmission system comprising a master cylinder and a reserve tank in communication therewith, a prime mover piston and a valve piston in said cylinder, said valve piston controlling the flow of fluid to and from the reserve tank in response to the movements of the prime mover piston, said prime mover piston comprising a rigid head, an elastic packing ring, and a rigid thrust member, the packing ring having its periphery normally and initially at least partially spaced from the cylinder wall, plural means for yieldably supporting said packing between said head and thrust member, the pressure of one of said means increasing progressively with the compression stroke, the pressure of the other of said means remaining constant at all times, the packing ring expanding and contracting in the cylinder under the action of radial and axial hydraulic pressure.

16. A hydraulic system comprising a cylinder, a reserve tank in communication therewith and a liquid circuit between the two, a valve in said circuit, said valve comprising an expansible packing which is initially spaced from the cylinder wall, means for actuating said valve and expanding said packing, said liquid circuit being opened solely around the periphery of the valve packing when the valve is in static condition, and being closed when the valve is actuated by said actuating means, and the packing is expanded.

17. A hydraulic system comprising a cylinder, a reserve tank in communication therewith and a liquid circuit between the two, a valve in said circuit, said valve comprising an expansible packing which is initially spaced from the cylinder wall, the valve having a bore throughout its length, means for actuating said valve and expanding said packing, said liquid circuit being open both around the periphery of the valve and through its bore when the valve is in static condition, and being closed when the valve is actuated by said actuating means and the packing is expanded.

18. A hydraulic master cylinder with a reserve tank and an external hydraulic circuit in communication therewith, a packing for the base of the cylinder and opposed pistons yieldably supported in the cylinder under contrasting axial pressure of spring members, both pistons being slidable in the cylinder, one of the pistons functioning as a prime mover, the other piston functioning as a valve member to control communication with the reserve tank, the valve piston comprising a rigid thrust member and a rigid head with an expansible packing interposed therebetween, the valve piston and cylinder base packing being bored longitudinally throughout to establish free communication between the cylinder and the external hydraulic circuit, one of said spring members bearing against the base of the cylinder and the adjacent face of the thrust member, the other spring bearing against the prime mover piston and the opposite face of the thrust member, said rigid head serving to space the packing from the reserve tank communicating means and abutting against the cylinder base packing, the valve piston being retracted from the cylinder base packing by suction during the retractile stroke of the prime mover piston to permit hydraulic fluid to be drawn into the cylinder between said cylinder base packing and the adjacent face of the head.

19. A hydraulic pressure transmission system comprising a master cylinder and a reserve tank in communication therewith, a prime mover piston and a valve piston in said cylinder, said valve piston controlling the flow of fluid to and from the reserve tank in response to the movements of the prime mover piston, said prime mover piston comprising a rigid head, an elastic packing ring and a rigid thrust member, the packing ring having its periphery normally and initially at least partially spaced from the cylinder wall, spring means for yieldably supporting said packing between the head and thrust member, the pressure of one of said means increasing progressively with the compression stroke, the pressure of the other of said means remaining substantially constant throughout, the packing expanding and contracting in the cylinder under the action of radial and axial hydraulic pressure.

PHILIP SIDNEY BALDWIN.